United States Patent
Shibutani et al.

(10) Patent No.: US 8,129,076 B2
(45) Date of Patent: Mar. 6, 2012

(54) ELECTRODE FOR LITHIUM BATTERIES AND METHOD OF MANUFACTURING ELECTRODE FOR LITHIUM BATTERIES

(75) Inventors: Satoshi Shibutani, Osaka (JP); Yuko Ogawa, Osaka (JP); Kazuyoshi Honda, Osaka (JP)

(73) Assignee: Panasonic Corporation, Osaka (JP)

( * ) Notice: Subject to any disclaimer, the term of this patent is extended or adjusted under 35 U.S.C. 154(b) by 543 days.

(21) Appl. No.: 12/373,021

(22) PCT Filed: Jan. 31, 2008

(86) PCT No.: PCT/JP2008/051525
§ 371 (c)(1),
(2), (4) Date: Jan. 8, 2009

(87) PCT Pub. No.: WO2008/093777
PCT Pub. Date: Aug. 7, 2008

(65) Prior Publication Data
US 2009/0311602 A1    Dec. 17, 2009

(30) Foreign Application Priority Data

Feb. 2, 2007    (JP) .................................. 2007-023938

(51) Int. Cl.
*H01M 4/38*    (2006.01)
*H01M 4/04*    (2006.01)

(52) U.S. Cl. .................. 429/523; 429/218.1; 429/221; 429/223; 252/182.1; 252/513; 252/521.2; 252/521.3; 136/239; 136/261; 427/78; 29/623.5; 204/290.01; 204/291; 204/292

(58) Field of Classification Search ............... 429/218.1, 429/221, 223, 523; 252/182.1, 513, 521.2; 252/521.3; 136/239, 261; 427/78; 29/623.5; 204/290.01, 291, 292
See application file for complete search history.

(56) References Cited

U.S. PATENT DOCUMENTS
5,506,075 A    4/1996    Iwasaki et al.
(Continued)

FOREIGN PATENT DOCUMENTS
EP    0 615 296 A1    9/1994
(Continued)

OTHER PUBLICATIONS

Extended European Search Report issued in European Patent Application No. 08704272.7-2119/2051318 PCT/JP2008051525, dated Feb. 24, 2010.
(Continued)

*Primary Examiner* — Brian P Mruk
(74) *Attorney, Agent, or Firm* — McDermott Will & Emery LLP

(57) ABSTRACT

To accelerate a film formation rate in forming a negative electrode active material film by vapor deposition using an evaporation source containing Si as a principal component, and to provide an electrode for lithium batteries which is superior in productivity, and keeps the charge and discharge capacity at high level are contemplated. The method of manufacturing an electrode for lithium batteries of the present invention includes the steps of: providing an evaporation source containing Si and Fe to give a molar ratio of Fe/(Si+Fe) being no less than 0.0005 and no greater than 0.15; and vapor deposition by melting the evaporation source and permitting evaporation to allow for vapor deposition on a collector directly or through an underlying layer. The electrode for lithium batteries of the present invention includes a collector, and a negative electrode active material film which includes $SiFe_yO_x$ (wherein, $0<x<2$, and $0.0001 \leq y/(1+y) \leq 0.03$) and is laminated on the collector directly or through an underlying layer.

9 Claims, 2 Drawing Sheets

U.S. PATENT DOCUMENTS

| | | |
|---|---|---|
| 2004/0265691 A1 | 12/2004 | Imoto |
| 2006/0051670 A1 | 3/2006 | Aramata et al. |
| 2006/0102473 A1 | 5/2006 | Bito et al. |
| 2006/0210875 A1 | 9/2006 | Kogetsu et al. |
| 2006/0286458 A1 | 12/2006 | Sato et al. |
| 2007/0172734 A1 | 7/2007 | Noguchi et al. |
| 2008/0176132 A1 | 7/2008 | Hirose et al. |

FOREIGN PATENT DOCUMENTS

| | | |
|---|---|---|
| JP | 05-159780 | 6/1993 |
| JP | 07-230800 | 8/1995 |
| JP | 10-092683 | 4/1998 |
| JP | 11-007979 | 1/1999 |
| JP | 2000-077075 | 3/2000 |
| JP | 2004-349237 | 12/2004 |
| JP | 2005-018998 | 1/2005 |
| JP | 2005-203377 | 7/2005 |
| JP | 2006-260944 | 9/2006 |
| JP | 2007-026805 * | 2/2007 |
| JP | 2007-027084 | 2/2007 |
| JP | 2007-200646 | 8/2007 |
| JP | 2007-257868 | 10/2007 |
| WO | WO 2005/057715 A1 | 6/2005 |

OTHER PUBLICATIONS

M.D. Fleischauer et al., "Combinatorial Investigation of Si-M (M=Cr+Ni, Fe, Mn) Thin Film Negative Electrode Materials," Electrochemical and Solid-State Letters, vol. 8, No. 2, Jan. 2005, pp. A137-A140.

Il Seok Kim et al., "High capacity Si/C nanocomposite anodes for Li-ion batteries," Journal of Power Sources vol. 136, No. 1, 2004, pp. 145-149.

* cited by examiner

ELECTRODE FOR LITHIUM BATTERIES AND METHOD OF MANUFACTURING ELECTRODE FOR LITHIUM BATTERIES

RELATED APPLICATIONS

This application is the U.S. National Phase under 35 U.S.C. §371 of International Application No. PCT/JP2008/051525, filed on Jan. 31, 2008, which in turn claims the benefit of Japanese Application No. 2007-023938, filed on Feb. 2, 2007, the disclosures of which Applications are incorporated by reference herein.

TECHNICAL FIELD

The present invention relates to an electrode for lithium batteries, and a method of manufacturing an electrode for lithium batteries. More specifically, the present invention relates to a film formation method of a negative electrode active material film, and an electrode for lithium batteries which can be manufactured using the method.

BACKGROUND ART

In recent years, as down sizing and multi-functionalization of portable equipments have advanced, increase of capacity of batteries has been demanded accordingly.

Si—O negative electrodes are promising as a high-capacity negative electrode in lithium batteries since lithium can show a large amount of storage, and thus a number of types of such electrodes have been investigated. Examples of the method of forming Si—O on a collector include methods in which Si—O particles are mixed with a binder and a solvent to prepare a paste, which is then coated, dried and flat-rolled, as well as vapor deposition methods, and the like.

Among these technical methods, the vapor deposition method is a dry process that is advantageous in increase of the energy density without including a binder, and is also superior in productivity since it can achieve a high film formation rate. Patent Document 1 discloses a method of forming an Si—O film by vacuum vapor deposition, sputtering or ion plating.

Patent Document 2 discloses a negative electrode for secondary cells including a negative electrode active material layer provided on a collector, in which the negative electrode active material layer contains Si and Fe, with the ratio of the number of both atoms being 19:1 to 1:9, in other words, the number of moles of Fe accounting for no less than 5.3% with respect to that of Si. In addition, the negative electrode active material layer is disclosed to be formed into a film by binary simultaneous vapor deposition.

Also, in connection with an oxide of a multicomponent material containing Si, Patent Document 3 discloses a method of film formation by a vapor deposition process using a material prepared by mixing Fe and Si with the ratio of the atoms being Fe:Si=98:2 to 65:35, as an evaporation source to obtain a Fe—Si—O based magnetic film.

Patent Document 1: Japanese Unexamined Patent Application, First Publication No. 2004-349237
Patent Document 2: Japanese Unexamined Patent Application, First Publication No. 2007-26805
Patent Document 3: Japanese Unexamined Patent Application, First Publication No. Hei 10-92683

DISCLOSURE OF THE INVENTION

Problems to be Solved by the Invention

The aforementioned Patent Document 1 discloses use of an SiO sintered compact, or a mixed sintered compact of Si powder and $SiO_2$ powder, as an evaporation source for obtaining an Si—O film. According to Patent Document 1, there is described that an Si—O powder sintered compact is preferred in view of the film formation rate, however, use of the Si—O powder sintered compact as an evaporation source may raise a problem of high cost for synthesizing such Si—O powder.

In Patent Document 1 described above, film formation with an Si cluster as an evaporation source by introducing an oxygen gas is also disclosed. According to such a procedure, film formation is carried out in an oxidizing atmosphere using as a material an Si cluster cut out from Si ingot produced by a casting process. Thus formed film has battery performances that are almost equal to the case in which a mixed sintered compact was used, and the oxidizing atmosphere can be attained by introducing an oxygen gas. However, it is merely described that the film formation rate is low since splash is more likely to be generated than the mixed sintered compact because allowing the Si atom to be radiated from the material surface is necessary, but any means for accelerating the film formation rate is not referred to in film formation methods carried out using Si as a principal component in the evaporation source in combination with an oxygen gas.

The aforementioned Patent Document 2 discloses setting of the number of moles of Fe accounting for no less than 5.3% with respect to that of Si in a negative electrode active material layer, for the purpose of improving the output characteristics of the battery, and also describes that the proportion less than this lower limit may lead to deterioration of the effect of improving the electric conductivity, and suppressing the volume change accompanying with charge and discharge of the negative electrode active material. However, no description is found with respect to the number of moles of Fe accounting for the value of less than 5.3% in the negative electrode active material layer, and also the relationship between the Fe content and the film formation rate is not referred to. Moreover, just a binary simultaneous vapor deposition is described, but unitary vapor deposition using Si as a principal component in the evaporation source is not described.

In addition, although a material containing Fe and Si mixed together is used as an evaporation source in the aforementioned Patent Document 3, this document merely discloses a method for obtaining an oxide film containing Fe as a principal component, distinct from the electrode for lithium batteries of the present invention in which Si is included as a principal component.

The present invention solves the foregoing problems, and an object of the invention is to improve the productivity by accelerating the film formation rate in forming a negative electrode active material film by carrying out vapor deposition using an evaporation source containing Si as a principal component.

Also, another object of the present invention is to provide an electrode for lithium batteries being superior in productivity due to accelerated film formation rate of the negative electrode active material film, while keeping the charge and discharge capacity at high level.

Means for Solving the Problems

In order to solve the foregoing problems, the method of manufacturing an electrode for lithium batteries of the present invention includes the steps of: providing an evaporation source containing Si and Fe to give a molar ratio of Fe/(Si+Fe) within the range of no less than 0.0005 and no greater than 0.15; and vapor deposition by melting the evaporation source and permitting evaporation to allow for vapor deposition on a collector directly or through an underlying layer.

According to this constitution, the productivity can be improved by accelerating the film formation rate in forming a negative electrode active material film by carrying out vapor deposition using an evaporation source containing Si as a principal component.

Furthermore, the present invention also relates to an electrode for lithium batteries including a collector, and a negative electrode active material film which includes $SiFe_yO_x$ (wherein, $0<x<2$, and $0.0001 \leq y/(1+y) \leq 0.03$) and is laminated on the collector directly or through an underlying layer.

According to this constitution, an electrode for lithium batteries can be provided which is superior in productivity due to accelerated film formation rate of the negative electrode active material film, while keeping the charge and discharge capacity at high level.

Moreover, the present invention also relates to a lithium battery including a negative electrode constituted with an electrode for lithium batteries, a positive electrode provided opposite to the negative electrode, and a separator provided between the negative electrode and the positive electrode. Further, the present invention also relates to a method of manufacturing a lithium battery including the steps of: providing an evaporation source containing Si and Fe to give a molar ratio of Fe/(Si+Fe) within the range of no less than 0.0005 and no greater than 0.15; vapor deposition by melting the evaporation source and permitting evaporation to allow for vapor deposition on a collector directly or through an underlying layer thereby producing a negative electrode; providing a separator; providing a positive electrode; and placing the separator between the negative electrode and the positive electrode.

According to this constitution, a lithium battery can be provided which is superior in productivity, while keeping the charge and discharge capacity still at high level.

Effects of the Invention

According to the method of manufacturing an electrode for lithium batteries of the present invention, film formation rate of the negative electrode active material film can be accelerated without altering the process conditions (voltage and electric current of the electronic beam, and the like when an electronic beam vapor deposition method is employed) in vapor deposition in which an evaporation source containing Si as a principal component is used. Therefore, the productivity can be improved.

In addition, although the electrode for lithium batteries of the present invention is superior in productivity since the film formation rate of the negative electrode active material film is accelerated, the charge and discharge capacity can be still kept at high level.

Moreover, according to the lithium battery and the method of manufacturing the same of the present invention, a lithium battery can be provided which has a negative electrode that is superior in productivity, while keeping the charge and discharge capacity at high level.

BEST MODE FOR CARRYING OUT THE INVENTION

Hereinafter, embodiments of the present invention are explained with reference to attached drawings.

Embodiments

In the embodiments, the case in which an electronic beam vapor deposition method is used as a vapor deposition method is explained.

FIG. 1 shows a schematic drawing illustrating an apparatus for use in manufacturing the electrode for lithium batteries of the present invention. In FIG. 1, chamber 15 is vacuum pumped, and film formation of a negative electrode active material film on collector 1 is carried out by allowing evaporation source 2 to be evaporated.

The collector 1 is taken up from unwinding roll 11, moved along the surface of can roll 12, and wound around winding roll 13. When the collector 1 moves along the can roll 12, film formation of an active material film is permitted on the collector 1 at the opening of mask 14. The evaporation source 2 is charged in a material vessel, and heated by en electronic beam (not shown in the figure) to allow for evaporation. The material vessel is constructed by, for example, disposing crucible 3 in water-cooled copper hearth 4. Oxygen nozzle 16 is provided in the chamber 15, whereby an oxygen gas fed from oxygen steel cylinder 18 is introduced into the chamber 15 while regulating with mass flow controller 17 to provide in a predetermined amount. Thus, the film formation step can be carried out in an oxygen atmosphere. The chamber 15 is vacuum pumped using oil diffusion pump 20 and oil-sealed rotary pump 21 via vacuum pumping tube 19. Accordingly, an $SiFe_yO_x$ film is formed as a negative electrode active material film on the collector 1.

As the collector 1, a metal foil may be used, and examples of the metal which may be used include copper, as well as aluminum, stainless steel, nickel, titanium and the like. The film thickness may be approximately 1 to 50 μm. An underlying layer may be provided on the surface of the collector 1, and for example, chromium oxide or the like can be used as the underlying layer.

As the evaporation source 2 of the present invention, a material containing Si and Fe to give a molar ratio of Fe/(Si+Fe) of no less than 0.0005 and no greater than 0.15 may be used. The present inventors elaborately investigated, and consequently found that the film formation rate is accelerated when Si is includes as a principal component and a small amount of Fe is also included, as compared with the case in which the evaporation source contains only Si. When the molar ratio is less than 0.0005, or greater than 0.15, the effect of accelerating the film formation rate cannot be achieved. The charge and discharge capacity of the lithium battery tends to be decreased when the amount of blended Fe is increased with the molar ratio falling within this range, therefore, the amount of blended Fe is desirably as low as possible for the purpose of keeping charge and discharge capacity at high level. In this respect, the upper limit of the molar ratio is preferably no greater than 0.06, more preferably no greater than 0.03, and still more preferably no greater than 0.026. Moreover, the lower limit of the molar ratio is preferably no less than 0.005, and more preferably no less than 0.01, since the film formation rate can be further accelerated, and the electric resistance of the resulting negative electrode active material film can be reduced. The electric resistance, which may be represented by the surface electrical resistivity or the like, of the resulting negative electrode active material film is preferably as low as possible since the electrostatic propensity of the electrode can be lowered, whereby adhesion of particles to the electrode during the process for assembly of the battery can be suppressed. Additionally, the impedance of the battery can be lowered by reducing the resistance of the negative electrode active material film, and thus discharge characteristics during discharging at heavy electric currents or in low temperature environments can be improved.

In the present invention, unitary vapor deposition is carried out using the evaporation source as described above. The unitary vapor deposition herein means vapor deposition carried out using single evaporation source containing both Si and Fe, and is distinguished from binary vapor deposition carried out using an evaporation source containing Si, and an evaporation source containing Fe, which are charged in separate crucibles, respectively. The unitary vapor deposition is markedly preferred than the binary vapor deposition since the composition of the resulting $SiFe_yO_x$ film can be readily uniformized, whereby performances of the resulting negative electrode active material films are stabilized, and the construction of the film formation apparatus can be more simplified.

The evaporation source used in the present invention contains Si as a principal component, and is distinct from those containing a compound in which Si is bound to O such as SiO, $SiO_2$ or the like as a principal component. The evaporation source used in the present invention may be any of a compound powder or a compound mass of an alloy and the like including Si as a principal component with Fe being included at a predetermined ratio, or may be a mixture of powder or mass of Si and powder or mass of Fe. The state of the evaporation source before melting may be heterogeneous to some extent since the evaporation source is molten at around the melting point of Si by heating with an electronic beam, and a small amount of Fe is homogenized in the molten solution of Si.

Continuous supply of the evaporation source according to the present invention during the film formation is preferred since film formation for a long period of time is enabled, leading to improvement of the productivity.

The crucible in which the evaporation source is charged is suitably made of carbon. The carbon crucible hardly reacts with the molten solution of Si, and is resistant to heat shock; therefore, it is less likely to break during vapor deposition or in completing vapor deposition, and can be repeatedly used. The crucible material is not limited to carbon, but other material which is accompanied by low reactivity with the molten solution of Si, and is resistant to heat shock can be also used.

The mechanism for the acceleration of the film formation rate in the present invention has been uncertain. However, it is speculated that since the ionization energy is 7.87 eV for Fe, and 8.15 eV for Si, beam focusing of the electronic beam is improved in comparison with the case in which Si alone was included, due to the difference in the ionization energy, whereby topical liquid temperature of the evaporation source is increased to enhance the amount of vapor deposition. With respect to such a mechanism, acceleration of the film formation rate in the present invention is an effect which can be achieved only in the case of unitary vapor deposition, but not achieved in the case of binary vapor deposition.

When the manufacturing method of the present invention is carried out in an oxygen atmosphere, a negative electrode active material film constituted with $SiFe_yO_x$ can be obtained. Herein, x falls within the range that satisfies the formula of: $0<x<2$, while y falls within the range that satisfies the formula of: $0 \leq y/(1+y) \leq$ about 0.1. The film thickness of the resulting negative electrode active material film is preferably, for example, approximately 0.1 to 50 μm.

When the ratio of Fe in thus resulting $SiFe_yO_x$ film is increased, charge and discharge capacity of the lithium battery tends to be decreased; therefore, the value of $y/(1+y)$, i.e., molar ratio of $Fe/(Si+Fe)$, is preferably as small as possible. When a lithium battery is produced with the $SiFe_yO_x$ film as a negative electrode active material film, and then allowed to be charged and discharged, the charge and discharge capacity almost equal to an $SiO_x$ film without including Fe can be achieved, provided that the value of $y/(1+y)$ is no less than 0.0001 and no greater than 0.03. The value of $y/(1+y)$ exceeding 0.03 is not preferred since the charge and discharge capacity is markedly decreased. In view of possibility of still further acceleration of the film formation rate, and reduction of the electric resistance of the resulting film, the lower limit of the value of $y/(1+y)$ is preferably no less than 0.001, and more preferably no less than 0.004. Moreover, the upper limit of the value of $y/(1+y)$ is preferably no greater than 0.015, and more preferably no greater than 0.011 since charge and discharge capacity that is equal to or greater than that of an $SiO_x$ film without including Fe (i.e., having the value of $y/(1+y)$ being 0) can be attained.

In the aforementioned $SiFe_yO_x$ film, the value x satisfies the formula of: $0<x<2$, but it preferably falls within the range of $0.1 \leq x \leq 1.0$ because cycle characteristics are likely to be inferior when the ratio of oxygen is small, while charge and discharge capacity is likely to be decreased when the ratio of oxygen is large.

The electrode for lithium batteries constructed as in the foregoing is significantly superior in terms of the productivity as compared with conventional electrodes in which an $SiO_x$ film without including Fe is used, although almost equal charge and discharge capacity could be achieved. The electrode for lithium batteries of the present invention may be used as a negative electrode in lithium batteries.

The negative electrode for lithium secondary cells of the present invention can be applied to coin cells, cylindrical cells having a group of spiral electrode plates as well as square cells, and the like. For example, a lithium-containing transition metal oxide such as lithium cobaltate ($LiCoO_2$), lithium nickelate ($LiNiO_2$), lithium manganate ($LiMn_2O_4$) or the like can be used for a positive electrode active material layer, but not limited thereto. Furthermore, the positive electrode active material layer may be constituted with a positive electrode active material alone, or may be constituted with a combined agent containing the positive electrode active material, a binding agent and a conductive agent.

EXAMPLES

Hereinafter, the present invention is explained in more detail by way of Examples, but the present invention is not limited to these Examples.

Example 1

An evaporation source 2 was prepared using a monocrystal Si ingot manufactured by Kojundo Chemical Co., Ltd., crushed into a size of approximately 1 cm to form masses, and an iron powder manufactured by Kojundo Chemical Co., Ltd., having a purity of no less than 99.99%, with which 190 g of Si and 10.2 g of Fe were admixed. The prepared evaporation source 2 was then charged in a carbon crucible 3. The molar ratio of $Fe/(Si+Fe)$ in the evaporation source was about 0.026. When the molar composition is represented by percentage, it is about 2.6% by mole.

Film formation was carried out using a roughened electrolytic copper foil (thickness: 35 μm) manufactured by FURUKAWA CIRCUIT FOIL CO., LTD. as a collector 1 with the aforementioned vacuum vapor deposition apparatus shown in FIG. 1. The collector 1 is moved from the unwinding roll 11 along the surface of the can roll 12 at a velocity of 1.0 cm/min to be taken up by the winding roll 13. When the collector 1 is moved along the surface of the can roll 12, the negative electrode active material film is formed at a time point of passage through the opening of the mask 14 having a length of the opening of 15 cm in a length direction of the collector. Therefore, the film formation time period is 15 min. The carbon crucible 3 charged with the evaporation source 2 was placed in a water-cooled copper hearth 4 below and opposite to the can roll 12, and heated with an electronic beam at an accelerating voltage of −10 kV, and an emission electric current of 650 mA. An oxygen nozzle 16 was disposed in the chamber 15, and an oxygen gas was introduced from an oxygen gas steel cylinder 18 at a flow rate of 40 SCCM regulated by a mass flow controller 17, while emitting the gas with an oil diffusion pump 20 and an oil-sealed rotary pump 21 to a degree of vacuum being 0.01 Pa. Under the conditions described above, a long electrode was produced by continuous film formation with a vacuum vapor deposition method to provide a negative electrode active material film on the collector 1.

Cross-sectional observation of the resulting film with SEM revealed the thickness of 26 μm, and thus the film formation rate was proven to be 29 nm/sec.

The amounts of Si and Fe of the resulting film were analyzed by an ICP emission spectrochemical analysis, while the amount of O was analyzed by an infrared ray absorption technique in accordance with JIS Z2613. As a result, each amount was 2.9 mg/cm$^2$ for Si, 0.062 mg/cm$^2$ for Fe, and 0.88 mg/cm$^2$ for O. Therefore, the film composition could be represented by $SiFe_{0.011}O_{0.53}$ in terms of $SiFe_yO_x$, and thus the molar ratio in the film, Fe/(Si+Fe), i.e., the value of y/(1+y) was about 0.011. As a result of measurement of the surface electrical resistivity of the obtained sample as described above with a high resistivity meter Hiresta manufactured by Mitsubishi Chemical Corporation using an URS probe, a value of 3.9 E+8Ω/□ was found.

The obtained sample as described above was punched out to give a circle of φ12.5 mm, which was used as electrode 31 to serve as a negative electrode, and thus an R2016 coin battery (diameter: 20 mm, thickness: 1.6 mm) was produced via separator 32 of a polyethylene microporous film having a thickness of 20 μm manufactured by Asahi Kasei Corporation, with a lithium metal foil 33 having a thickness of 300 μm manufactured by Honjo Chemical Corporation to serve as a positive electrode. Outline of the cross section of the coin battery is shown in FIG. 2. Metal circular disc 34 for the power collection from the electrode 31, coned disc spring 35 for compressing the electrode, case 36, sealing plate 37 and gasket 38 for use in sealing and serving as external positive and negative end terminals were used, and a solution prepared by mixing ethylene carbonate and diethyl carbonate at a volume ratio of 1:1, and dissolving 1 mol/L lithium hexafluorophosphate therein was used as an electrolytic solution. The impregnation of the electrolytic solution was carried out by immersing the separator 32 and the electrode 31 in the electrolytic solution for 10 sec.

Thus produced coin battery was used and allowed to be charged and discharged. As a consequence, the initial charging capacity was 2,900 mAh/g, and the initial discharging capacity was 2,300 mAh/g, while the irreversible retention capacity was 600 mAh/g.

Example 2

A negative electrode active material film was formed on collector 1 in an almost similar manner to Example 1 except that 180 g of Si and 19.5 g of Fe were mixed and used as the evaporation source 2. Therefore, the molar ratio of Fe/(Si+Fe) in the evaporation source 2 was about 0.053. When the molar composition is represented by percentage, it is about 5.3% by mole.

The resulting film had a thickness of 28 μm, and thus the film formation rate was proven to be 31 nm/sec. Analysis for the composition of the resulting film with a similar method to Example 1 revealed the composition of $SiFe_{0.024}O_{0.63}$, thereby proving the molar ratio of Fe/(Si+Fe) in the film being about 0.023. As a result of measurement in a similar manner to Example 1, the surface electrical resistivity was 1.7 E+6Ω/□.

A coin battery was produced similarly to Example 1, and then allowed to be charged and discharged. Consequently, the initial charging capacity was 2,790 mAh/g, and the initial discharging capacity was 2,070 mAh/g, while the irreversible retention capacity was 720 mAh/g.

Example 3

A negative electrode active material film was formed on collector 1 in an almost similar manner to Example 1 except that metal Si (item number: #441) that contains a slight amount of Fe manufactured by Osaka Asahi Co., Ltd. was crushed into a size of approximately 1 cm to form masses, which were used as evaporation source 2 in a total weight of 200 g. As a result of ICP emission spectrochemical analysis of the metal Si used as the evaporation source 2, the amount of Fe was revealed to be 0.39% by mass. Therefore, the molar ratio of Fe/(Si+Fe) in the evaporation source 2 was about 0.0020. When the molar composition is represented by percentage, it is about 0.2% by mole.

The resulting film had a thickness of 23 μm, and thus the film formation rate was proven to be 25 nm/sec. An X-ray fluorescence analysis for the composition of the resulting film revealed the molar ratio of Fe/(Si+Fe) in the film being about 0.00022. The molar ratio determined by an X-ray fluorescence analysis is not substantially different from the molar ratio determined by an ICP emission spectrochemical analysis.

As a result of measurement in a similar manner to Example 1, the surface electrical resistivity was 1.0 E+9Ω/□.

A coin battery was produced similarly to Example 1, and then allowed to be charged and discharged. Consequently, the initial charging capacity was 2,980 mAh/g, and the initial discharging capacity was 2,200 mAh/g, while the irreversible retention capacity was 780 mAh/g.

Example 4

A negative electrode active material film was formed on collector 1 in an almost similar manner to Example 1 except that 199.8 g of Si and 0.2 g of Fe were mixed and used as the evaporation source 2. Therefore, the molar ratio of Fe/(Si+Fe) in the evaporation source 2 was about 0.00050.

The resulting film had a thickness of 23 μm, and thus the film formation rate was proven to be 26 nm/sec. Analysis for the composition of the resulting film with a similar method to Example 1 revealed that Fe was included less than the detection lower limit, i.e., 0.002% by mass, with the molar ratio of Fe/(Si+Fe) being less than 0.00001. Therefore, the composition in the film of $SiO_{0.853}$ was ascertained. As a result of measurement in a similar manner to Example 1, the surface electrical resistivity was 6.7 E+8Ω/□.

A coin battery was produced similarly to Example 1, and then allowed to be charged and discharged. Consequently, the initial charging capacity was 2,900 mAh/g, and the initial discharging capacity was 2,200 mAh/g, while the irreversible retention capacity was 700 mAh/g.

Example 5

A negative electrode active material film was formed on collector 1 in an almost similar manner to Example 1 except that 196.06 g of Si and 3.94 g of Fe were mixed and used as the evaporation source 2. Therefore, the molar ratio of Fe/(Si+Fe) in the evaporation source 2 was about 0.010.

The resulting film had a thickness of 23 μm, and thus the film formation rate was proven to be 26 nm/sec. Analysis for the composition of the resulting film with a similar method to Example 1 revealed the composition of $SiFe_{0.0041}O_{0.809}$, thereby proving the molar ratio of Fe/(Si+Fe) in the film being about 0.0041. As a result of measurement in a similar manner to Example 1, the surface electrical resistivity was 3.4 E+8Ω/□.

A coin battery was produced similarly to Example 1, and then allowed to be charged and discharged. Consequently, the initial charging capacity was 2,930 mAh/g, and the initial discharging capacity was 2,150 mAh/g, while the irreversible retention capacity was 780 mAh/g.

Example 6

A negative electrode active material film was formed on collector 1 in an almost similar manner to Example 1 except that 163.8 g of Si and 36.2 g of Fe were mixed and used as the evaporation source 2. Therefore, the molar ratio of Fe/(Si+Fe) in the evaporation source 2 was about 0.10.

The resulting film had a thickness of 23 μm, and thus the film formation rate was proven to be 26 nm/sec. Analysis for the composition of the resulting film with a similar method to Example 1 revealed the composition of $SiFe_{0.054}O_{0.805}$, thereby proving the molar ratio of Fe/(Si+Fe) in the film being about 0.051. As a result of measurement in a similar manner to Example 1, the surface electrical resistivity was less than 1.0 E+5Ω/□.

A coin battery was produced similarly to Example 1, and then allowed to be charged and discharged. Consequently, the initial charging capacity was 2,680 mAh/g, and the initial discharging capacity was 2,080 mAh/g, while the irreversible retention capacity was 600 mAh/g.

Comparative Example 1

A negative electrode active material film was formed on collector 1 in an almost similar manner to Example 1 except that 200 g of Si alone was used as the evaporation source 2. As a result of the evaporation source 2 with an X-ray fluorescence analysis, the amount of Fe was less than the detection lower limit, i.e., 0.001% by mass, while the molar ratio of Fe/(Si+Fe) in the evaporation source 2 was less than 0.000005.

The resulting film had a thickness of 22 μm, and thus the film formation rate was proven to be 24 nm/sec. An X-ray fluorescence analysis for the composition of the resulting film revealed that Fe was included less than the detection limit, i.e., 0.001% by mass, with the molar ratio of Fe/(Si+Fe) in the film being less than 0.000005. As a result of measurement in a similar manner to Example 1, the surface electrical resistivity was 1.0 E+9Ω/□.

A coin battery was produced similarly to Example 1, and then allowed to be charged and discharged. Consequently, the initial charging capacity was 2,900 mAh/g, and the initial discharging capacity was 2,300 mAh/g, while the irreversible retention capacity was 600 mAh/g.

Comparative Example 2

A negative electrode active material film was formed on collector 1 in an almost similar manner to Example 1 except that 133.4 g of Si and 66.6 g of Fe were mixed and used as the evaporation source 2. Therefore, the molar ratio of Fe/(Si+Fe) in the evaporation source 2 was about 0.20.

The resulting film had a thickness of 16 μm, and thus the film formation rate was proven to be 18 nm/sec. Analysis for the composition of the resulting film with a similar method to Example 1 revealed the composition of $SiFe_{0.19}O_{0.827}$, thereby proving the molar ratio of Fe/(Si+Fe) in the negative electrode active material film being about 0.16. As a result of measurement in a similar manner to Example 1, the surface electrical resistivity was less than 1.0 E+5Ω/□.

A coin battery was produced similarly to Example 1, and then allowed to be charged and discharged. Consequently, the initial charging capacity was 2,080 mAh/g, and the initial discharging capacity was 1,520 mAh/g, while the irreversible retention capacity was 560 mAh/g.

The molar ratio of Fe/(Si+Fe) of the evaporation source 2 used in Examples and Comparative Examples, the film formation rate, the molar ratio of Fe/(Si+Fe) in the resulting negative electrode active material film (i.e., the value of y/(1+y)), and the surface electrical resistivity are shown in Table 1, while the initial charging capacity, the initial discharging capacity, and the irreversible retention capacity are shown in Table 2. In Table 1 and Table 2, the data are presented in the order of the Examples exhibiting the smaller molar ratio of Fe/(Si+Fe) in the evaporation source.

As is clear from Table 1, it was proven that addition of a slight amount of iron to the evaporation source such that a molar ratio of Fe/(Si+Fe) falls within the range of no less than 0.0005 and no greater than 0.15 (Examples 1 to 6) accelerates the film formation rate as compared with the cases of Comparative Example 1 in which the evaporation source not including iron was used, and Comparative Example 2 in which iron was added in an amount of more than 0.15 in terms of the molar ratio, and that the surface electrical resistivity is equal to or lower than those in such Comparative Examples.

Also, as is seen from Table 2, when the value of y/(1+y) in thus resulting $SiFe_yO_x$ film is no less than 0.0001 and no greater than 0.03 (in Examples 1 to 3, and Example 5), the initial charging capacity and the initial discharging capacity attained an almost equivalent to the case in which the value y is 0 (no greater than detection lower limit). In other words, when the value y falls within the above range, the charge and discharge capacity can be also kept at high level while achieving the acceleration of the film formation rate described above.

In all Examples, the molar ratio of Fe/(Si+Fe) in the negative electrode active material film is decreased as compared with the molar ratio of Fe/(Si+Fe) in the evaporation source. This tendency is more marked in Examples with the lower molar ratio of Fe/(Si+Fe).

TABLE 1

|  | Evaporation source Molar ratio of Fe/(Si + Fe) | Film formation rate (nm/sec) | Negative electrode active material film Molar ratio of Fe/(Si + Fe) | Surface electrical resistivity (Ω/□) |
|---|---|---|---|---|
| Example 4 | 0.00050 | 26 | 0 | 6.7E+08 |
| Example 3 | 0.0020 | 25 | 0.00022 | 1.0E+09 |
| Example 5 | 0.010 | 26 | 0.0041 | 3.4E+08 |
| Example 1 | 0.026 | 29 | 0.011 | 1.5E+07 |
| Example 2 | 0.053 | 31 | 0.023 | 1.7E+06 |
| Example 6 | 0.10 | 26 | 0.051 | <1.0E+5 |
| Compar. Ex. 1 | 0 | 24 | 0 | 1.0E+09 |
| Compar. Ex. 2 | 0.20 | 18 | 0.16 | <1.0E+5 |

TABLE 2

|  | Initial charging capacity (mAh/g) | Initial discharging capacity (mAh/g) | Irreversible retention capacity (mAh/g) |
|---|---|---|---|
| Example 4 | 2900 | 2200 | 700 |
| Example 3 | 2980 | 2200 | 780 |
| Example 5 | 2930 | 2150 | 780 |
| Example 1 | 2900 | 2300 | 600 |
| Example 2 | 2790 | 2070 | 720 |
| Example 6 | 2680 | 2080 | 600 |
| Compar. Ex. 1 | 2900 | 2300 | 600 |
| Compar. Ex. 2 | 2080 | 1520 | 560 |

INDUSTRIAL APPLICABILITY

The electrode for lithium batteries according to the present invention is useful in lithium secondary cells that require high capacity. The shape is not particularly limited, but can be applied to lithium batteries in a variety of shapes such as coin type as demonstrated in Examples, as well as cylindrical type used in a spiral form.

Description of Reference Numerals and Signs

Figure 1:
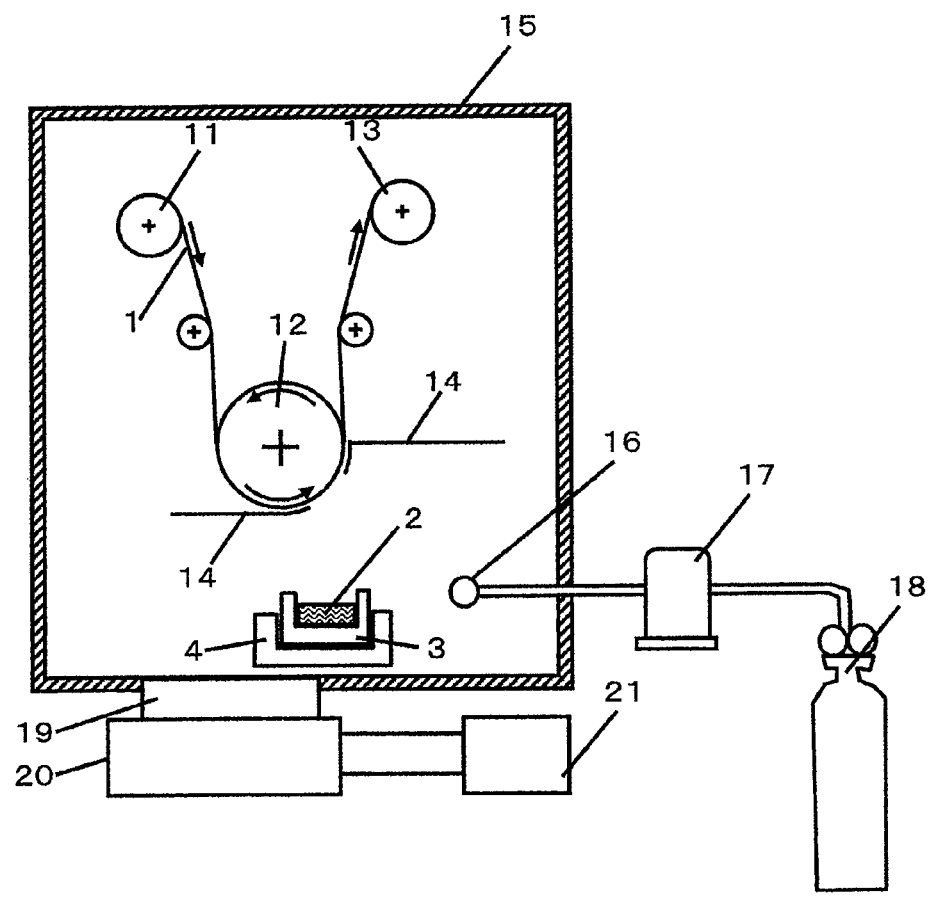
FIG. 1 shows a schematic drawing of the vacuum vapor deposition apparatus in embodiments of the present invention.
Figure 2:
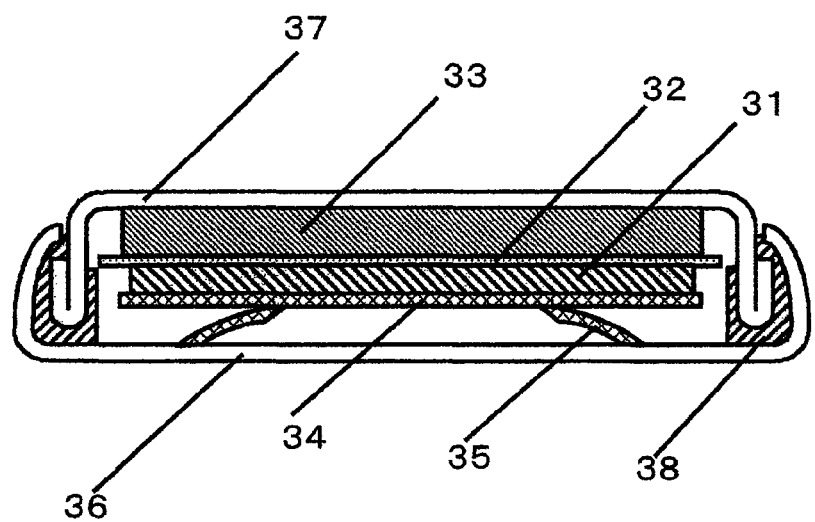
FIG. 2 shows a schematic drawing of the cross section of an R2016 coin battery in Examples of the present invention.

| 1: | collector |
| 2: | evaporation source |
| 3: | crucible |
| 4: | copper hearth |
| 11: | unwinding roll |
| 12: | can roll |
| 13: | winding roll |
| 14: | mask |
| 15: | chamber |
| 16: | oxygen nozzle |
| 17: | mass flow controller |
| 18: | oxygen steel cylinder |
| 19: | vacuum piping |
| 20: | oil diffusion pump |
| 21: | oil-sealed rotary pump |
| 31: | electrode (negative electrode) |
| 32: | separator |
| 33: | lithium metal foil (positive electrode) |
| 34: | metal circular disc |
| 35: | coned disc spring |
| 36: | case |
| 37: | sealing plate |
| 38: | gasket |

The invention claimed is:

1. A method of manufacturing an electrode for lithium batteries, the method comprising steps of:
   providing a single melted source, as an evaporation source, containing Si and Fe having a molar ratio of Fe/(Si+Fe) within the range of no less than 0.0005 and no greater than 0.15; and
   vapor depositing a layer including Si and Fe on a collector directly or through an underlying layer.

2. The method of manufacturing an electrode for lithium batteries according to claim 1, wherein the molar ratio of Fe/(Si+Fe) in the melted source is no less than 0.0005 and no greater than 0.06.

3. The method of manufacturing an electrode for lithium batteries according to claim 2, wherein the molar ratio of Fe/(Si+Fe) in the melted source is no less than 0.01 and no greater than 0.06.

4. The method of manufacturing an electrode for lithium batteries according to claim 1, wherein the step of vapor depositing is carried out in an oxygen atmosphere.

5. An electrode for lithium batteries comprising:
   a collector, and
   a negative electrode active material film which comprises $SiFe_yO_x$, wherein $0<x<2$, and $0.0001 \leqq y/(1+y) \leqq 0.03$, and is laminated on the collector directly or through an underlying layer.

6. The electrode for lithium batteries according to claim 5, wherein the value of $y/(1+y)$ is no less than 0.001 and no greater than 0.03.

7. A lithium battery comprising:
   a negative electrode constituted with the electrode for lithium batteries according to claim 5 or 6;
   a positive electrode provided opposite to the negative electrode; and
   a separator provided between the negative electrode and the positive electrode.

8. A method of manufacturing a lithium battery, the method comprising steps of:
   providing a single melted source, as an evaporation source, containing Si and Fe having a molar ratio of Fe/(Si+Fe) within the range of no less than 0.0005 and no greater than 0.15;
   vapor depositing a layer including Si and Fe on a collector directly or through an underlying layer thereby producing a negative electrode;
   providing a separator;
   providing a positive electrode; and
   placing the separator between the negative electrode and the positive electrode.

9. The electrode for lithium batteries according to claim 5, wherein the value of $y/(1+y)$ is no less than 0.001 and no greater than 0.0041.

* * * * *